United States Patent [19]

Naoi et al.

[11] Patent Number: 4,669,009

[45] Date of Patent: May 26, 1987

[54] FLOPPY DISC RECORDING AND/OR REPRODUCING APPARATUS HAVING A LOADING MECHANISM FOR LOADING A CARTRIDGE WHICH ACCOMODATES A FLOPPY DISC

[75] Inventors: Mitsuaki Naoi, Tokyo; Azuma Miyazawa, Hatano; Hideharu Arai, Yokohama, all of Japan

[73] Assignee: Mitsumi Electric Co., Ltd., Japan

[21] Appl. No.: 545,254

[22] Filed: Oct. 25, 1983

[30] Foreign Application Priority Data

Oct. 26, 1982 [JP] Japan ................ 57-161811[U]
Jan. 31, 1983 [JP] Japan ................ 58-12454[U]

[51] Int. Cl.⁴ .......... G11B 5/016; G11B 5/55; H02K 17/00; H02K 49/00
[52] U.S. Cl. .................... 360/99; 360/106; 310/159
[58] Field of Search .......... 360/97, 99, 106, 133; 310/159, DIG. 6

[56] References Cited

U.S. PATENT DOCUMENTS

| 3,947,893 | 3/1976 | Hall, Sr. ................ 360/133 |
| 4,517,617 | 5/1985 | Tsuji et al. ............ 360/99 |

FOREIGN PATENT DOCUMENTS

| 0032771 | 7/1981 | European Pat. Off. . |
| 0082505 | 6/1983 | European Pat. Off. . |
| 3026432 | 1/1981 | Fed. Rep. of Germany . |
| 58-9564 | 1/1983 | Japan ................ 310/DIG. 6 |
| 58-118001 | 7/1983 | Japan ................ 360/97 |
| 2105091 | 3/1983 | United Kingdom ........ 360/97 |
| 2127205 | 4/1984 | United Kingdom ........ 360/99 |

OTHER PUBLICATIONS

W. E. Beach; Bail Adjusting Mechanism; IBM Technical Disclosure Bulletin; vol. 21, No. 12, May 1979; pp. 4969-4972.

Machine Design, vol. 39, No. 28, Dec. 7, 1967, pp. 44, 45, Cleveland, U.S.; "Miniature Jukebox Lets You Carry A Tune-in Stereo".

Primary Examiner—Robert S. Tupper
Assistant Examiner—Melissa J. Kova
Attorney, Agent, or Firm—Andrus, Sceales, Starke & Sawall

[57] ABSTRACT

A floppy disc recording and/or reproducing apparatus comprises a loading mechanism which has a support member which is fixed to the frame and has cam levers pivotally supported thereon, where each of the cam levers have a second cam part, a cartridge holder which has a first cam part and is arranged movable in upward and downward directions of the apparatus under guidance of the support member, and a push-eject member which has third and fourth cam parts and an ejecting push-button. The push-eject member is movable in frontward and rearward directions of the apparatus under guidance of the frame or the support member. A sequence of operations are carried out when a cartridge which accommodates the floppy disc is placed onto the cartridge holder so as to load the cartridge with respect to a driving shaft. The sequence of operations includes an operation in which the cam levers are directly or indirectly rotated by the cartridge, an operation in which the push-eject member is moved in the frontward direction of the apparatus due to an interaction between the second and fourth cam parts, and an operation in which the cartridge holder is moved in the downward direction of the apparatus due to an interaction between the first and third cam parts.

10 Claims, 13 Drawing Figures

FLOPPY DISC RECORDING AND/OR REPRODUCING APPARATUS HAVING A LOADING MECHANISM FOR LOADING A CARTRIDGE WHICH ACCOMODATES A FLOPPY DISC

BACKGROUND OF THE INVENTION

The present invention generally relates to floppy disc recording and/or reproducing apparatuses, and more particularly to a floppy disc recording and/or reproducing apparatus which is designed so that when a floppy disc cartridge which accommodates a floppy disc is inserted into a cartridge holder of a loading mechanism, the cartridge holder moves downwards of the apparatus while a push-eject member which is provided with a push-button for carrying out an ejecting operation moves frontwards of the apparatus, to carry out the loading of the floppy disc cartridge.

Recently, as a type of a magnetic disc for storing information, a so-called floppy disc is used in word processing systems and the like. Presently, there are two kinds of standardized floppy discs, one having a diameter of 8 inches, and the other having a diameter of 5 inches. These floppy discs are accommodated within a flexible cover or envelope which is provided with windows. The thickness of the flexible cover is extremely thin.

When carrying out recording or reproduction in a conventional floppy disc recording and/or reproducing apparatus, the cover accommodating the floppy disc is inserted into the main apparatus body. The cover is positioned, so that the floppy disc is concentrically positioned with respect to a disc driving shaft. Next, when a predetermined lever is manipulated, a tapered pad which is free to undergo idling rotation moves toward the disc driving shaft to lightly push the central part of the floppy disc, in the periphery of the center hole in the floppy disc, against the disc driving shaft. The floppy disc is rotated unitarily with the disc driving shaft in this state. Accordingly, the cover, that is, the floppy disc is not displaced along the axis of the disc driving shaft.

In addition to the two kinds of floppy discs described above, a floppy disc having a diameter of 3 inches has recently been developed in order to meet various demands. Because the size of this 3-inch floppy disc is small, the floppy disc is accommodated within a rigid plastic cartridge instead of a flexible cover, so as to facilitate the handling of the floppy disc and provide positive protection against large shock which may be applied to this small cartridge.

A disc recording and/or reproducing apparatus which operates together with the floppy disc which is accommodated within the rigid plastic cartridge, is disclosed in a U.S. Pat. No. 3,770,905, for example. According to the disclosed apparatus, the cartridge accommodating the floppy disc is first inserted into a cartridge holder, because the thickness of the cartridge is greater than the thickness of the extremely thin flexible cover described before. The inserted cartridge is positioned concentrically with a driving shaft, within the cartridge holder. The cartridge holder then moves toward the driving shaft so as to load the floppy disc with respect to the driving shaft.

However, according to the apparatus disclosed in the above U.S. patent, the loading and unloading of the floppy disc with respect to the driving shaft, are carried out by slightly rotating the cartridge holder and therefore the cartridge about a predetermined position by a small angle. That is, the cartridge holder can assume positions in two planes. The cartridge is in an unloaded state in a plane which is slightly rotated with respect to a horizontal plane, and is in a loaded state in the horizontal plane. Hence, in order to place the cartridge and therefore the floppy disc into the loaded state, the operator had to first insert the cartridge into the cartridge holder, and then manipulate a lever which is integrally provided with respect to the cartridge holder so as to slightly rotate the cartridge holder to a loading position. As a result, two independent operations, one being the operation to insert the cartridge into the cartridge holder and the other being the manipulation of the lever, had to be carried out in order to load the cartridge. Therefore, there was a disadvantage in that these operations were troublesome to carry out.

SUMMARY OF THE INVENTION

Accordingly, it is a general object of the present invention to provide a novel and useful floppy disc recording and/or reproducing apparatus, in which the above described disadvantages have been eliminated.

Another and more specific object of the present invention is to provide a floppy disc recording and/or reproducing apparatus which is designed so that, as a cartridge accommodating a floppy disc is inserted into a cartridge holder of the apparatus upon loading, the cartridge is automatically moved (lowered) together with the cartridge holder towards a disc driving shaft to assume a loaded state in response to this insertion of the cartridge. The apparatus is also designed so that, when a push-eject member is pushed inwardly of the apparatus upon unloading, the cartridge is automatically ejected towards the front of the apparatus after the cartridge is moved (raised) and returned.

Still another object of the present invention is to provide a floppy disc recording and/or reproducing apparatus in which the above push-eject member is designed to have a substantially U-shaped cross section, and this push-eject member is fitted over a projecting table formed on the frame of the apparatus. According to the apparatus of the present invention, the precision with which the push-eject member is moved, is improved, and as a result, the operational characteristic of the apparatus as a whole is improved.

A further object of the present invention is to provide a floppy disc recording and/or reproducing apparatus, in which a motor having a small thickness is provided on a printed circuit plate which is mounted on a frame. According to the apparatus of the present invention, the thickness of the apparatus as a whole can be reduced.

Other objects and further features of the present invention will be apparent from the following detailed description when read in conjunction with the accompanying drawings.

DETAILED DESCRIPTION

First, description will be given with respect to the general construction of a first embodiment of a floppy disc recording and/or reproducing apparatus according to the present invention, by referring to FIGS. 1 through 3.

Figure 1:
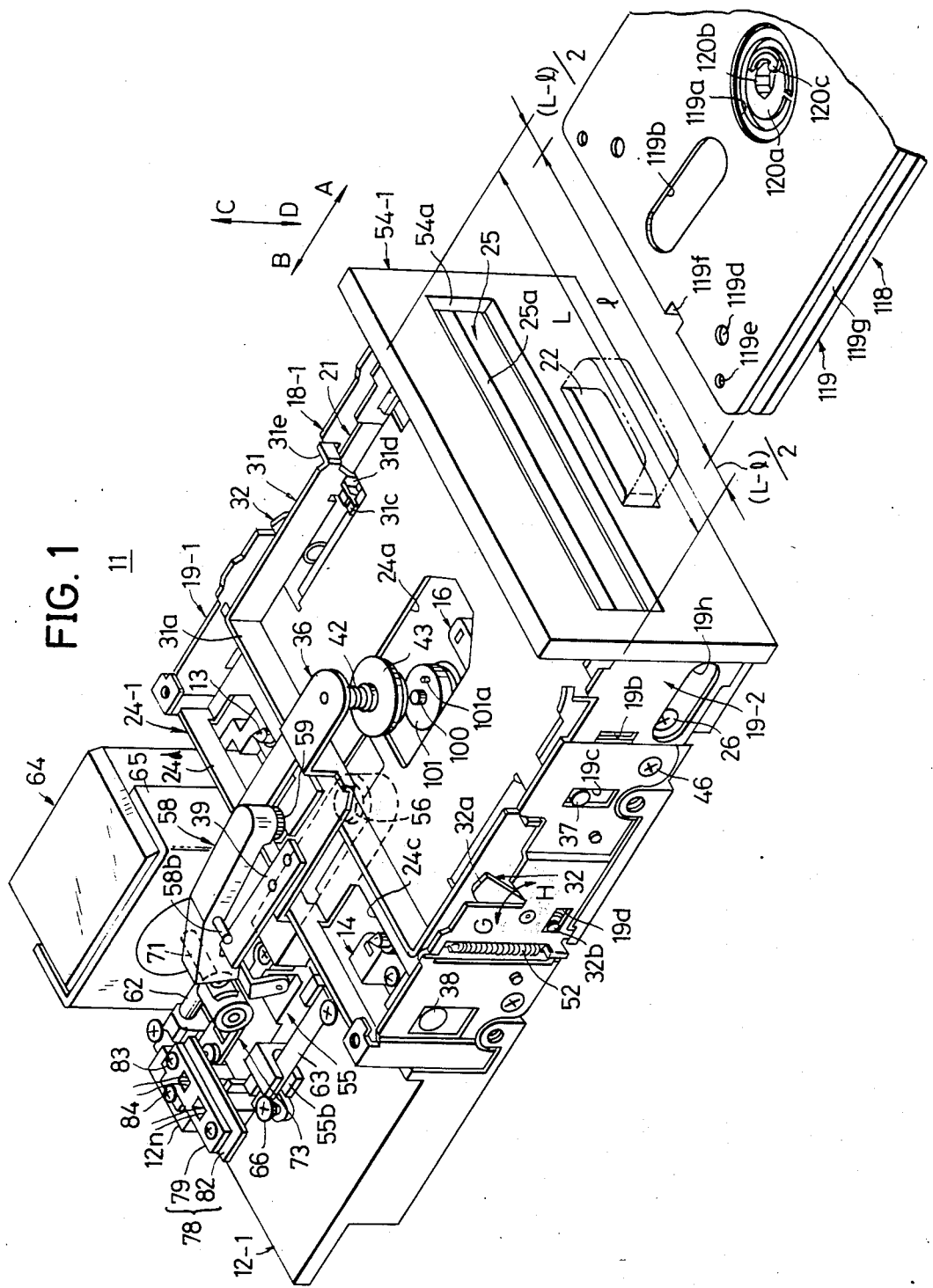
FIG. 1 is a perspective view showing a first embodiment of a floppy disc recording and/or reproducing apparatus according to the present invention is its entirety.
Figure 2:
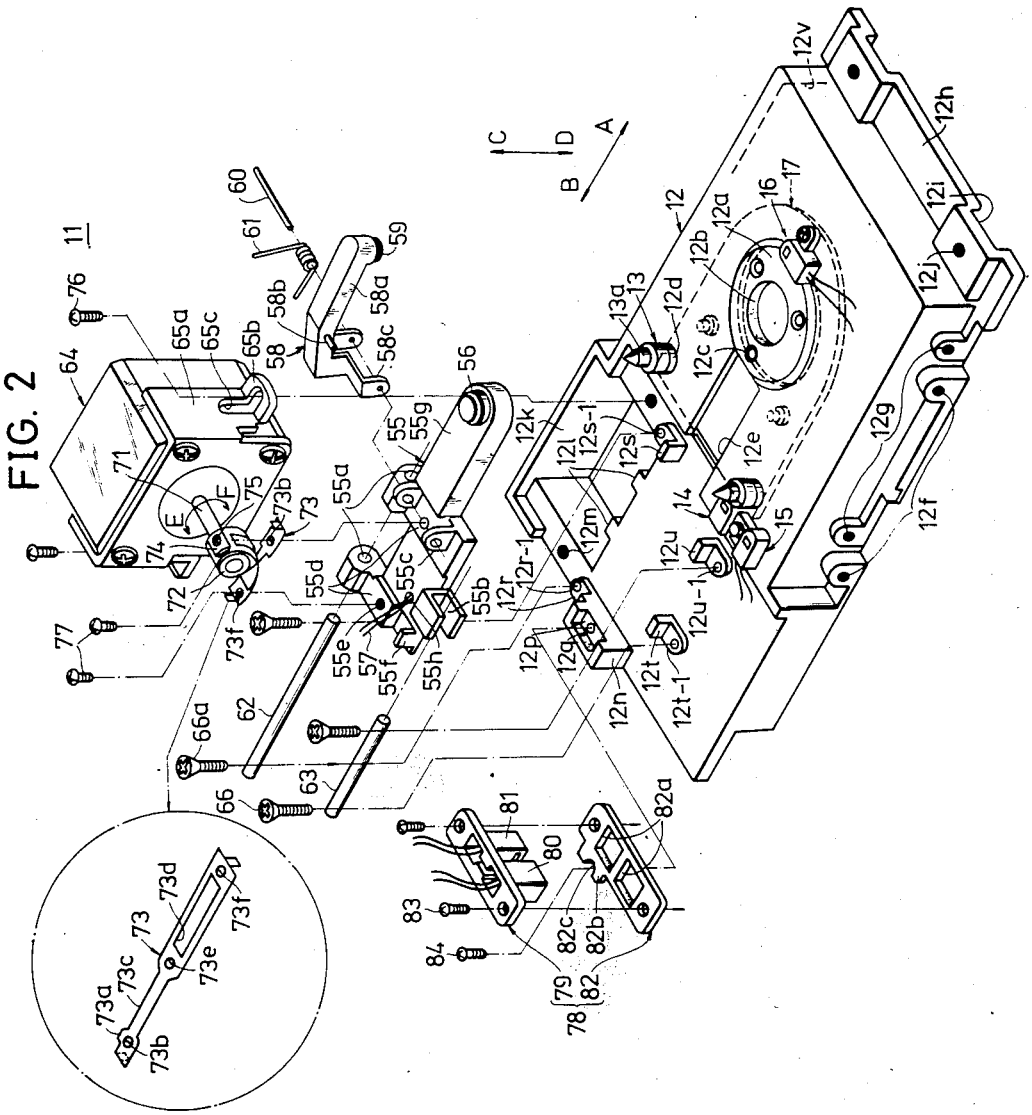
FIGS. 2 and 3 are disassembled perspective views respectively showing a peripheral part of a frame and a loading mechanism in the apparatus shown in FIG. 1.
Figure 3:
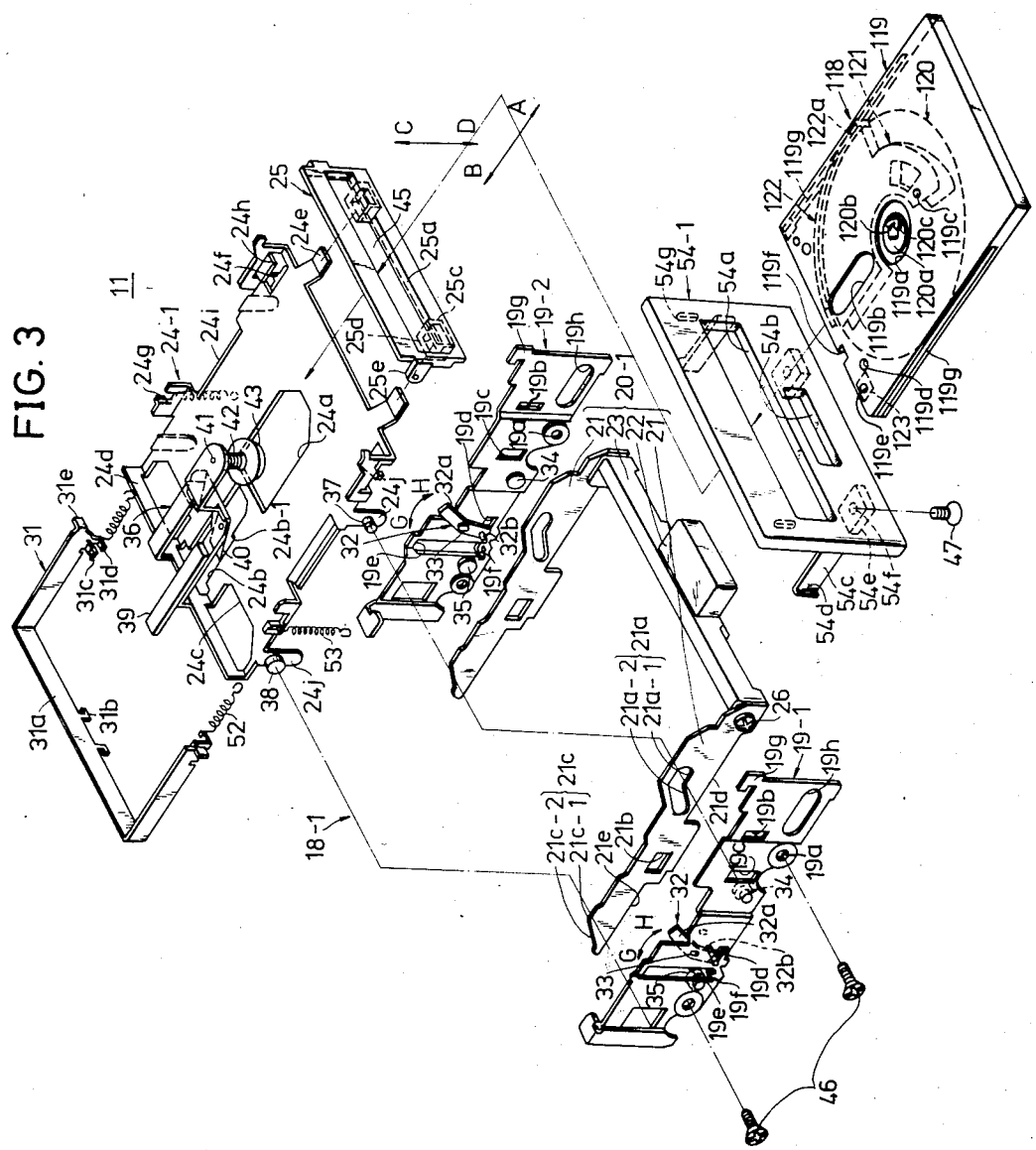

In FIGS. 1 through 3, a floppy disc recording and/or reproducing apparatus 11 comprises a frame 12-1. The frame 12-1 is molded from aluminum by die casting. As shown in FIG. 2, a central projecting part 12a is formed at the upper surface of the frame 12-1, at a location closer to the front of the apparatus. The central projecting part 12a comprises a central hole 12b, and three holes 12c. A pair of projections 12d are formed on the upper surface of the frame 12-1. These projections 12d each have a positioning pin 13. The positioning pin 13 comprises a small diameter part 13a, and is fixed on the projection 12d. A window 12e is formed in a central part of the frame 12-1. Sensors 14, 15, and 16 each accommodating a light receiving element, are mounted on the upper surface of the frame 12-1 at the locations shown. The sensor 14 detects side of a cartridge. The sensor 15 is provided to detect a state where an erroneous erasure is prevented, and the sensor 16 is provided to detect the position where the recording or reproduction of a track on a floppy disc is started. Screw holes 12f and 12g are provided on both sides of the frame 12-1. A support plate part 12h is provided at the front of the frame 12-1, and this support plate part 12h comprises a pair of depressions 12i and a pair of screw holes 12j.

A motor accommodating opening 12k is formed at the rear of the frame 12-1, and a pair of positioning ribs 12l are formed on an inner wall of the opening 12k. Screw holes 12m are formed in the front and at the back of the opening 12k. A rectangular projection 12n is formed at the rear on the upper surface of the frame 12-1. This rectangular projection 12n comprises a depression 12p and a screw hole 12q. An L-shaped support part 12r and a screw hole 12r-1 are formed on the right side of the rectangular projection 12n. Three L-shaped support parts 12s, 12t, and 12u respectively having screw holes 12s-1, 12t-1, and 12u-1, are formed on the upper surface of the frame 12-1 at the locations shown. The L-shaped support parts 12r and 12s are accurately aligned in the directions indicated by arrows A and B, and the L-shaped support parts 12t and 12u are also aligned in the directions indicated by the arrows A and B. A steel sheet 17 is fixed to the bottom surface of the frame 12-1 within a depression 12v, and a part of this steel sheet 17 is exposed through the window 12e. It will be assumed that three sensors (not shown) each accommodating a light emitting element (not shown), are fixed above the frame 12-1 so as to oppose the sensors 14, 15, and 16, and that the sensors 14, 15, and 16 receive the light emitted from the three sensors which are not shown.

A loading mechanism 18-1 comprises side plates 19-1 and 19-2, a push-eject plate 20-1 for ejecting the cartridge, a cartridge holder 24-1, and a push-out plate 31. The push-eject plate 20-1 comprises a pair of cam plates 21, and a connecting rod 23 which is screwed onto the cam plates 21 by screws 26. A push-button 22 is fixed to the connecting rod 23. The cartridge holder 24-1 comprises a door holder 25. The left side plate 19-1 comprises a pair of mounting holes 19a, an engaging hole 19b, a vertical cam hole 19c, a stopper hole 19d, a spring accommodating hole 19e, an engaging projection 19g, and an elongated hole 19h. The spring accommodating hole 19e comprises a projection 19f for hooking one end of a spring. A cam lever 32 is pivotally supported by a pin 33 on the inner wall of the left side plate 19-1. In addition, the cam lever 32 comprises an upper part 32a, and a cam pin 32b which projects to the right and left at the lower end of the cam lever 32. A pair of guide pins 34 and 35 are further provided on the left side plate 19-1. The right side plate 19-2 has shape and design symmetrical to the shape and design of the left side plate 19-1. The side plates 19-1 and 19-2 are fixed on both sides of the frame 12-1 by screws 46 which are inserted through the screw holes 12g.

Each of the cam plates 21 of the push-eject plate 20-1, has a boomerang-shaped cam hole 21a, a rectangular cam hole 21b, a cam part 21c, and horizontal guide parts 21d and 21e. The cam hole 21a comprises a horizontal cam part 21a-1 and a sloping cam part 21a-2, and functions as a third cam part. The cam hole 21b functions as a fourth cam part. The cam part 21c comprises a horizontal cam part 21c-1 and a sloping cam part 21c-2, and also functions as the third cam part. The push-eject plate 20-1 is arranged between the side plates 19-1 and 19-2, and the horizontal guide parts 21d and 21e of each of the cam plates 21 ride on the guide pins 34 and 35. In addition, the guide pin 32b of each of the cam levers 32, enter within the rectangular cam hole 21b.

A central hole 24a formed at a central part of the cartridge holder 24-1. A guide slot 24b which has step parts 24b-1, and side holes 24c are formed in the rear part of the cartridge holder 24-1. A clamp lever 36 is fixed on a rear wall 24d of the cartridge holder 24-1. A pair of projecting plate parts 24e are formed in the front of the cartridge holder 24-1. Projecting hook parts 24f and 24g for hooking one end of a spring, a guiding projection 24h, and a guide plate part 24i, are provided on both sides of the cartridge holder 24-1. A pair of downwardly bent parts 24j which respectively have cam pins 37 and 38, are formed on both sides of the cartridge holder 24-1. The clamp lever 36 comprises a guide plate 39, a pair of leaf springs 40, and a tapered clamper 43 which is made of plastics. A pin 41 is inserted through a coil spring 42, and pivotally supports the tapered clamper 43.

Figure 5:
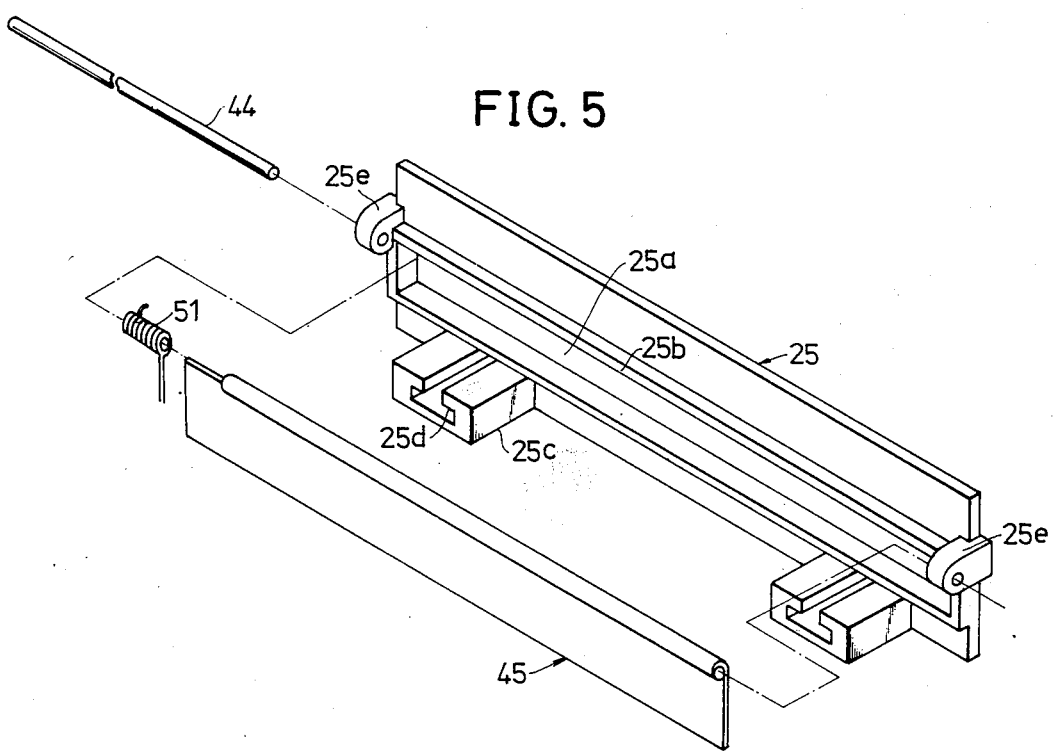
FIG. 5 is a disassembled perspective view showing a door holder and a door (blocking member) of the apparatus shown in FIG. 1.

The door holder 25 is made of plastics. As shown in FIG. 5, the door holder 25 comprises a window 25a, a step part 25b formed above the window 25a, a pair of engaging parts 25c, and a pair of support projections 25e. The pair of engaging parts 25c each have a catching groove 25d. The catching groove 25d has an inverted T-shape cross section as shown, so that the engaging part 25c is deformed slightly when the projecting plate part 24e is inserted into the catching groove 25d to firmly catch the projecting plate part 25c. A long pin 44 is inserted through a hole in one of the support projections 25e, and then through a torsion spring 51 and a metal door 45 before reaching a hole in the other support projection. The spring loaded metal door 45 is pivotally supported by the pin 44, and is urged to make contact with the step part 25b so as to close the window 25a. As shown in FIG. 3, the door holder 25 is mounted unitarily with respect to the cartridge holder 24-1, by fitting the engaging parts 25c over the projecting plate parts 24e so that the projecting plate parts 24e are inserted into the catching grooves 25d.

The push-out plate 31 has an inverted U-shape in the plan view. As shown in FIG. 3, the push-out plate 31 comprises a rear plate part 31a which has a pair of guide projections 31b, upper and lower guide projections 31c and 31d which are formed on both sides of the push-out plate 31a, and outwardly projecting cam plate parts 31e which are also formed on both sides of the push-out plate 31. The push-out plate 31 is arranged between the upper surface of the cartridge holder 24-1 and the clamp lever 36, in a state where the upper and lower guide projections 31c and 31d on both sides of the push-out plate 31 are guided by guide plate parts 24i which are respectively fit between the upper and lower guide projections 31c and 31d. Moreover, the guide projections 31b are guided by the guide slot 24b. Thus, the push-out plate 31 is slidable in the directions of the arrows A and B. A pair of coil springs 52 are respectively stretched between the lower guide projections 31d of the push-out plate 31 and the projecting hook parts 24f of the cartridge holder 24. Hence, the push-out plate 31 is urged in the direction of the arrow A by the coil springs 52, and normally, the push-out plate 31 is stopped in a state where the guide projections 31b is hitting the step parts 24b-1.

The cartridge holder 24-1 which is already fitted with the door holder 25 and the push-out plate 31, is arranged between the cam plates 21 of the push-eject plate 20-1. Thus, the cam pins 37 are each inserted through the horizontal cam part 21a-1 of the cam hole 21a in the cam plate 21, and then through the vertical cam hole 19c in the side plate 19-1 (19-2). Further, the cam pins 38 each ride on the horizontal cam part 21c-1 of the cam part 21c. A pair of coil springs 53 are stretched between the projecting hook parts 24g and the projections 19f of the side plates 19-1 and 19-2. Accordingly, the cartridge holder 24-1 is urged downward by these coil springs 53.

A front panel 54-1 made of a resin, comprises windows 54a and 54b. The front panel 54-1 further comprises a pair of engaging arms 54c, a pair of projecting plate parts 54e, and a pair of engaging depressions 54g. The engaging arms 54c each have a claw 54d, and the projecting plate parts 54e each have a hole 54f. When assembling the front panel 54-1 and the frame 12-1, the projecting plate parts 54e are fitted into the depressions 12i. Moreover, the claws 54d of the engaging arms 54c respectively engage with the engaging holes 19b in the side plates 19-1 and 19-2, and the engaging depressions 54g respectively engage with the engaging projections 19g of the side plates 19-1 and 19-2. In this state, the front panel 54-1 is fixed to the frame 12-1 by screws 47 which are screwed through the holes 54f in the front panel 54-1 and the screw holes 12j in the frame 12-1.

In the loading mechanism 18-1, the guide parts 21d and 21e of the cam plates 21 of the push-eject plate 20-1, are restrictively guided by the guide pins 34 and 35. Further, the heads of the screws 26 are restrictively guided by the elongated holes 19h in the side plates 19-1 and 19-2. Therefore, the push-eject plate 20-1 is only slidable to the front and rear of the apparatus, that is, in the directions of the arrows A and B. In this state, the cam pins 32b of the cam levers 32, are respectively within the rectangular cam holes 21b in the cam plates 21. Because the cam pins 37 are restrictively guided by the vertical cam holes 19c in the side plates 19-a and 19-2, the cartridge holder 24-1 is only slidable up and down, that is, in the directions of arrows C and D.

Normally, as shown in FIG. 1, the push-eject plate 20-1 is slid rearwards (direction of the arrow B) to the limit, and is in a so-called eject position. Accordingly, the cam pins 37 of the cartridge holder 24-1 are each commonly guided by the vertical cam hole 19c in the side plate 19-1 (19-2) and the horizontal cam part 21a-1 of the cam hole 21a in the cam plate 21. In this state, the cartridge holder 24-1 is slid upward (direction of the arrow C) to the limit against the forces exerted by the coil springs 53, and is in the eject position. In addition, the cam pin 32a of each of the cam levers 32 is pushed rearwards by the front edge of the rectangular cam hole 21b, and both the cam levers 32 are rotated to the limit in the direction of an arrow H. Thus, outwardly projecting parts of the cam pins 32b make contact with the read edges of the stopper holes 19d.

Suppose that the width of the loading mechanism 18-1 is represented by L, and the width of a floppy disc cartridge 118 which will be described later on is represented by l, where L is larger than l. According to the loading mechanism 18-1 shown in FIG. 1, the linked mechanism parts such as the side plates 19-1 and 19-2, the cam levers 32, the cam plates 21, the cam pins 37 and 38 of the cartridge holder 24-1, and the cam plate parts 31e of the push-out plate 31, are all provided within a relatively narrow space of (L−l). That is, with respect to one side of the loading mechanism 18-1, the linked mechanism parts are all provided within a space of (L−l)/2. Thus, the linked mechanism parts of the loading mechanism 18-1 are all downsized, and as a result, the overall size of the apparatus 11 is reduced.

A carriage 55 is molded from aluminum by die casting. As shown in FIG. 2, the carriage 55 comprises a pair of guide holes 55a, a guide groove 55b, a pair of projecting plate parts 55c, front and rear step parts 55d, and a projecting plate part 55f for interrupting light. The pair of step parts 55d each comprise a screw hole 55e. Lead wires 57 of a magnetic head 56 which is provided on a front projecting part 55g, run along a groove (not shown) formed in the bottom surface of the carriage 55, and is led out through a hole 55h. The magnetic head 56 comprises a recording and reproducing head and an erasing head which are arranged together.

A pad support arm 58 is made of a resin. The pad support arm 58 comprises a lightly bent main arm body 58a, a guide pin part 58b, a pad 59 fixed on the lower surface of the free end of the pad support arm 58, and a pair of projecting plate parts 58c. The projecting plate parts 58c of the pad support arm 58 respectively fit on the outer side of the projecting plate parts 55c of the carriage 55, and a pin 60 is inserted through the holes in the projecting plate parts 55c and 58c so as to pivotally support the pad support arm 58. A torsion spring 61 urges the pad support arm 58 downward, so as to lightly push a floppy disc 120 which will be described later on against the magnetic head 56. The combination of the magnetic head 56 and the pad support arm 58 is not limited to the above described construction. For example, the pad may be provided on the carriage 55 and the magnetic head may be provided on the arm 58.

Figure 4:
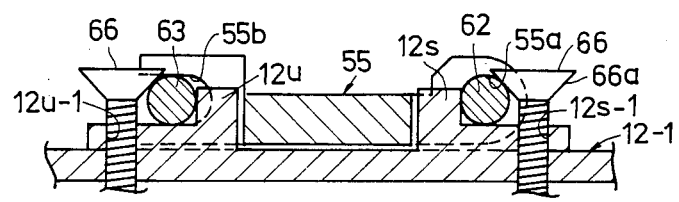
FIG. 4 is a view in vertical cross section showing a carriage guiding mechanism of the apparatus shown in FIG. 1.

A long guide bar 62 is arranged between the support parts 12r and 12s of the frame 12-1. The long guide bar 62 is held down and secured by tapered parts 66a of screws 66 which are screwed into the screw holes 12r-1 and 12s-1 as shown in FIG. 4. Accordingly, front and rear ends of the long guide bar 62 are pushed against the horizontal and vertical surfaces of the support parts 12r and 12s, and are accurately aligned with respect to the directions of the arrows A and B as the long guide bar 62 is secured. A short guide bar 63 is arranged similarly between the support parts 12t and 13u, and is accurately aligned with respect to the directions of the arrows A and B by the screws 66 as the short guide bar 63 is secured. The long guide bar 62 run through the guide holes 55a of the carriage 55, while the short guide bar 63 fit within the guide groove 55b. Thus, the carriage 55 is mounted freely slidable in the directions of the arrows A and B. In this state, the front projecting part 55g is guided within the window 12e, and is slidable on the metal sheet 17. In addition, the guide pin part 58b pushes against the guide plate 39 of the clamp lever 36, and the pad support arm 58 is stopped at a position separated from the magnetic head 56.

A stepping motor 64 is fitted into a U-shaped metal frame 65, and is fixed to the metal frame 65 by screws as shown in FIG. 2. The metal frame 65 comprises vertical side plate parts 65a, horizontal plate parts 65b, and an L-shaped elongated hole 65c which extends between the vertical side plate parts 65a and the horizontal plate parts 65b. A ring 72 is fitted over a shaft 71 of the motor 64. A belt holder 74 is fixed to the ring 72 by a screw 75, with a guide belt 73 inserted therebetween. This guide belt 73 takes the form of a thin leaf spring. As shown in an enlarged scale within a circle indicated by a one-dot chain line in FIG. 2, the guide belt 73 comprises a left head part 73a, a narrow part 73c, and slit 73d. The left head part 73a comprises a hole 73b. A center hole 73e and a hole 73f are formed on both sides of the slit 73d. The guide belt 73 is wrapped around the ring 72 on the shaft 71 so that the left head part 73b is inserted through the slit 73d, after the guide belt 73 is fixed to the shaft 71 by the screw 75 which penetrates the center hole 73e of the guide belt 73.

The motor 64 is accommodated within the motor accommodating opening 12k of the frame 12-1, and the surface of the metal frame 65 facing toward the shaft 71 makes contact with the inner surfaces of the positioning ribs 12l. The horizontal plate parts 65b make contact with the upper surface of the frame 12-1, and the metal frame 65 is fixed onto the frame 12-1 by screws 76 which are screwed through the elongated holes 65c and the screw holes 12m. Both ends of the guide belt 73 are fixed to the carriage 55 in a state where both ends of the guide belt 73 are pulled in the directions of the arrows A and B so that tension is developed in the guide belt 73. Screws 76 are inserted through the holes 73b and 55e and the holes 73f and 55e, to fix both ends of the guide belt 73 on the step parts 55d of the carriage 55. Thus, when the shaft 71 rotates in steps in the direction of an arrow F or E, the narrow part 73c of the guide belt 73 relatively move within the slit 73d, and the carriage 55 slides back and forth in steps in the direction of the arrows B and A. The inner surfaces of the positioning ribs 12l are subjected to machine processing so as to accurately match with the directions of the arrows A and B. Moreover, the metal frame 65 is positioned so that its surface facing toward the shaft 71 accurately lies perpendicular to the axis of the shaft 71. Accordingly, when mounting the motor 64, the axis of the shaft 71 perfectly perpendicular to the sliding direction of the carriage 55, and improves the operating accuracy of the carriage 55. The starting position of the carriage 55 may be set with ease by integrally adjusting the position of the motor 64 and the carriage 55 in the direction of the arrow A or B, within a range which is permitted by the provision of the elongated holes 65c for mounting the motor 64 onto the frame 12-1.

Because the guide belt 73, the carriage 55, and the guide bars 62 and 63 are mounted in the manner described heretofore, the guide belt 73 is located at an intermediate position between the mutually parallel guide bars 62 and 63, and further, the guide belt 73 is fixed to the carriage 55 so as to extend in parallel with the guide bars 62 and 63. Accordingly, a force which causes the carriage 55 to slide, acts at an intermediate position between the guide bars 62 and 63 in a direction which coincides with the sliding direction of the carriage 55. For this reason, a twisting force does not act on the carriage 55 in the horizontal plane, and the carriage 55 is smoothly slidable without play. In addition, the driving point of the guide belt 64, that is, the point where the guide belt 64 intersect, is located at a height position which substantially coincides with the height position of the guide bars 62 and 63. Therefore, a rotational force does not act on the carriage 55 in the vertical plane, and the carriage 55 is slidable with even more smoothness without play.

A switch unit 78 detects the start position of the carriage 55. The start position is the location of the carriage 55 when the carriage 55 is slid rearwards to the limit. The switch unit 78 comprises a switch casing 79 which is made of a resin, and a metal support plate 82. A pair of sensors (a light emitting element and a light receiving element) 80 and 81 are accommodated within the switch casing 79. Parts of the switch casing 79 which accommodate the sensors 80 and 81 are respectively inserted through rectangular holes 82a in the support plate 82, and the switch casing 79 is fixed on the support plate 82 by screws 83. The switch unit 78 is mounted on the frame 12-1 by fitting a projecting plate part 82b of the support plate 82 into the depression 12p of the rectangular projection 12n, and by inserting a screw 84 through a cutout part 82c of the support plate 82 and the screw hole 12q in the rectangular projection 12n. The projecting plate part 55f of the carriage 55 enters between the sensors 80 and 81 when the carriage 55 is slid to the limit in the direction of the arrow B. Accordingly, the switch unit 78 detects that the carriage 55 is slid to the limit in the direction of the arrow B, that is, to the start position, when the light between the sensors 80 and 81 is interrupted by the projecting plate part 55f. The motor 64 stops rotating in the direction of the arrow F when the switch unit 78 detects that the carriage 55 is located at the start position.

Figure 6:
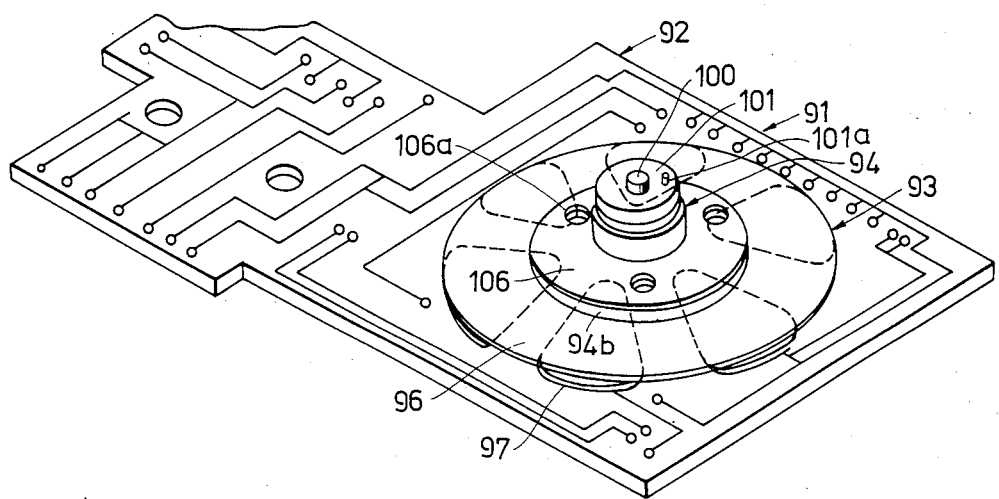
FIG. 6 is a perspective view showing a printed circuit unit of the apparatus shown in FIG. 1.
Figure 7:
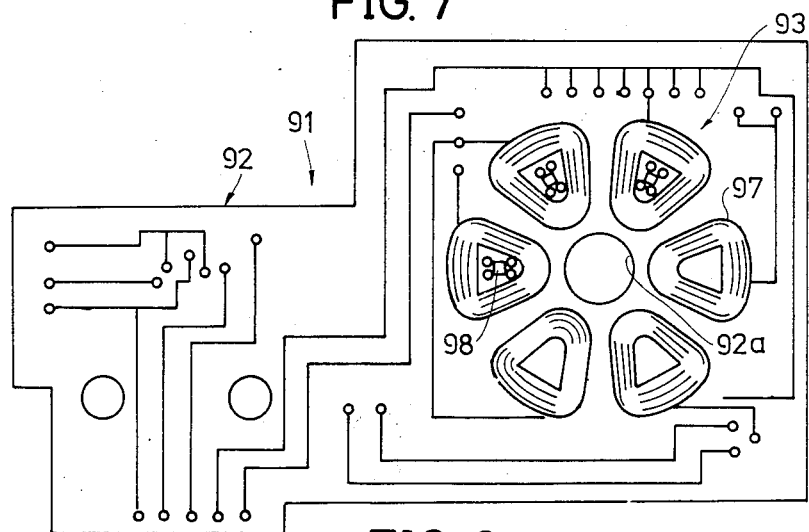
FIG. 7 is a plan view showing a motor for driving a floppy disc in the printed circuit unit shown in FIG. 6, in a state where coils of the motor are exposed.
Figure 8:
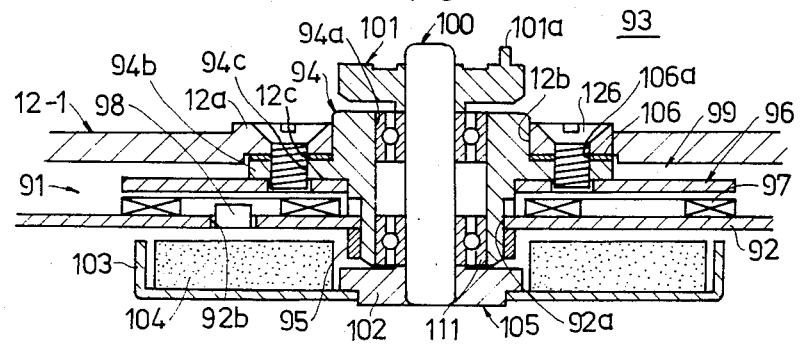
FIG. 8 is a view in vertical cross section showing the motor for driving the floppy disc in the printed circuit unit shown in FIG. 6.

FIGS. 6, 7, and 8 show a printed circuit unit 91 which comprises a base plate 92. The wiring is printed on the upper surface of the base plate 92, and circuit elements such as an integrated circuits (IC chips) are arranged on the bottom surface of the base plate 92. In FIG. 7, a motor 93 for driving the floppy disc and a driving circuit for driving the motor 93, are arranged on the right half of the base plate 92. On the other hand, a driving circuit for driving the stepping motor 64 is arranged on the left half of the base plate 92.

As shown in FIG. 8, the motor 93 comprises a stator 99, a rotor 105, and a ball bearing inserted between the stator 99 and the rotor 105. The stator 99 comprises a rotor hub 94 made of aluminum, a shield plate 106, a fixed ring 95, a yoke 96 made of a magnetic material, six coils 97, and three Hall elements 98. The shield plate 106 has three holes 106a. On the other hand, the rotor 105 comprises a shaft 100, a disc table 101, a bush 102, a magnet holder 103, and magnets 104. The rotor hub 94 of the stator 99 comprises a hole 94a, and a flange 94b which has three screw holes 94c. A ball bearing 111 is inserted into the hole 94a, and the yoke 96 is fitted to the bottom surface of the flange 94b. In addition, the lower end of the rotor hub 94 is fitted into a hole 92a in the base plate 92, and the fixed ring 95 is fitted over the lower end of the rotor hub 94 which projects below the base plate 92 so as to secure the rotor hub 94. Further, the shield plate 106 is fitted on the upper surface of the flange 94b.

As shown in FIG. 7, the coils 97 are each wound in the shape of a triangular loop. The coils 97 are flat, and are located at six equally spaced positions on the base plate 92. The leads of the coils 97 are respectively connected to the appropriate printed wiring on the base plate 92. The three Hall elements 98 are embeddedly in three holes 92b which are formed in the base plate 92. The holes 92b are each located at the central part of three of the coils 97, as shown in FIGS. 7 and 8. The leads of the Hall elements are respectively connected to the appropriate printed wiring on the base plate 92. The shaft 100 of the rotor 105 is inserted in the ball bearing 111. The disc table 101 which is made of brass and has a pin 101a, is fitted over the upper projecting part of the shaft 100. The bush 102 is fitted over the lower projecting part of the shaft 100. The magnet holder 103 which accommodates the magnets 104, is fixed onto the bush 102 from below the bush 102. The magnets 104 are located at eight equally spaced positions so that the N-pole and the S-pole of the magnets are arranged alternately. A printed conductor pattern (not shown) for generating a frequency which is in accordance with the rotational speed of the rotor 105, is arranged on the bottom surface of the base plate 92 at positions opposing the magnets 104. The printed conductor pattern of the square wave form is formed in a donut shape.

In the motor 93 described above, the Hall elements 98 are embeddedly provided in the holes 92b in the base plate 92. Thus, the thickness of the motor 93 is within the combined thickness of the base plate 92 and the coils 97. Accordingly, compared to the case where the Hall elements 98 are simply provided on the upper surface of the base plate 92 and the top parts of the Hall elements 98 project above the coils 97, the overall thickness of the motor 93 is not increased by the thickness of the Hall elements 98. As a result, the height of the motor 93 can be reduced compared to the above case, and the overall height of the apparatus 11 can be made small.

Figure 9:
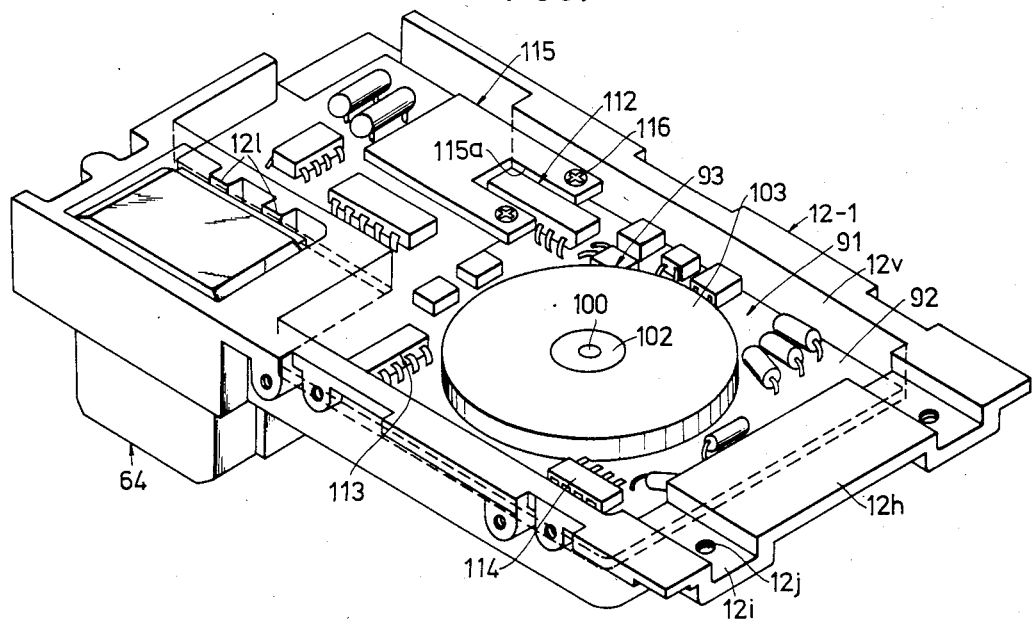
FIG. 9 is a perspective view showing the apparatus shown in FIG. 1 viewed from the bottom.
Figure 10:
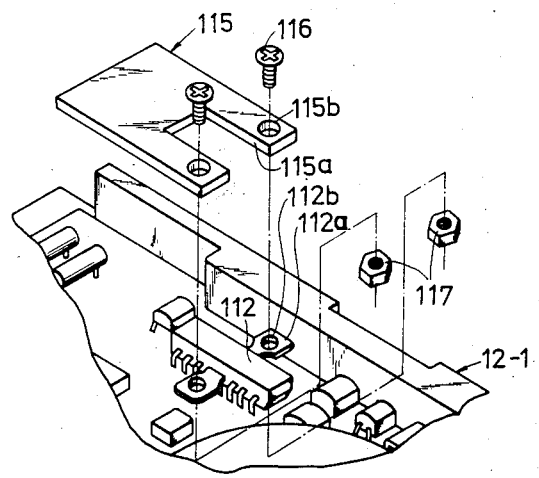
FIG. 10 is a disassembled perspective view showing an essential part of FIG. 9.

In FIG. 9, IC chips 112, 113, and 114 respectively are chips in a circuit for driving the motor 93. The chip 112 is used for the driving circuit of the motor 93, and the chips 113 and 114 are used for a motor speed control circuit of the motor 93. Because the chip 112 generates heat while in use, measures are taken to radiate the heat. That is, as shown in FIG. 10, a metal support plate 112a is integrally formed with the chip 112. The metal support plate 112a comprises a pair of holes 112b. A radiator plate 115 which is made of aluminum, comprises a cutout 115a and a pair of holes 115b. The radiator plate 115 is placed onto the chip 112 so that a part of the chip 112 fits within the cutout 115a. The radiator plate 115 is fixed onto the metal support plate 112, by screws 116 which penetrate the holes 115b and 112b and nuts 117 which secure the ends of the screws 116. Accordingly, the heat which is generated from the chip 112 is transferred to the radiator plate 115, and the heat is quickly radiated from the chip 112. Thus, the chip 112 is prevented from overheating.

As shown in FIG. 9, the printed circuit unit 91 is accommodated within the depression 12v formed in the bottom of the frame 12-1. The upper part of the rotor hub 94 is inserted through the central hole 12b, and the disc table 101 and the upper end of the rotor hub 94 protrude above the frame 12-1. The rotor hub 94 is fixed onto the frame 12-1 by three screws 126 which are inserted through the holes 12c, 106a, and 94c.

Next, description will be given with respect to the method of driving the motor 93. First, when a current is applied to the three Hall elements 98, a predetermined Hall element 98 generates a signal due to a magnetic flux formed between the magnets 104 and the yoke 96. This signal from the predetermined Hall element 98 is supplied to the driving circuit such as the IC chip 112 provided on the bottom surface of the base plate 92, and the driving circuit supplies a current to a predetermined coil 97. Thus, the magnetic flux introduced by the driving circuit and the magnetic flux introduced by the magnets 104 interact and the rotor 105 is rotated by a predetermined angle. Similarly thereafter, a predetermined Hall element 98 successively generates a signal, and a current is successively supplied to a predetermined coil 97. As a result, the rotor 105 undergoes a continuous and constant rotation. Furthermore, in this state, the magnetic flux introduced due to the magnets 104 penetrates in the circumferential direction of the printed conductor pattern formed on the bottom surface of the base plate 92, and the printed conductor pattern generates a signal having a frequency which is in accordance with the rotational speed of the rotor 105. The frequency of the signal generated by the printed conductor pattern, that is, the number of waveforms generated by the printed conductor pattern, is counted in the speed control circuit including IC chips such as the IC chips 113 and 114 which are also provided on the bottom surface of the base plate 92, and the rotational speed of the rotor 105 is detected. When the rotational speed of the rotor 105 deviates from a normal rotational speed, or when the rotational speed of the rotor 105 is to be changed, the rotational speed of the rotor 105 is controlled by varying the timing with which the application of current to the coils 97 is switched by use of the signal obtained from the above speed control circuit.

The floppy disc cartridge 118 comprises a cartridge chassis 119 as shown in FIGS. 1 and 3, and this cartridge chassis 119 accommodates the 3-inch floppy disc 120 and shutters 121. The cartridge chassis 119 comprises a center hole 119a, an elongated hole 119b provided in both surface sides of the cartridge chassis 119b, a hole 119c provided on both surface sides of the cartridge chassis 119, a pair of positioning holes 119d provided on both surface sides of the cartridge chassis 119, a pair of holes 119e provided on both surface sides of the cartridge chassis 119, a cutout 119f formed in the rear of the cartridge chassis 119, and a groove 119g formed along both sides of the cartridge chassis 119. In the present specification, the part of the cartridge comprising the cutout 119f will be referred to as the rear of the cartridge, and the cartridge 118 will therefore be inserted into the apparatus 11 from the rear of the cartridge 118 first. The magnetic head makes contact with the floppy disc 120 through the elongated hole 119b. The holes 119c enable detection of a rotational position of the disc 120 where the reproduction is to be started. The pair of positioning holes 119d are used to position the cartridge 118 in the loaded state. The pair of holes 119e are used to prevent erroneous erasure of recorded signals on the disc 120, and the cutout 119f is used to detect the surface side of the cartridge 118, that is, the surface side of the disc 120. As shown in FIG. 1, a hub 120a of the disc 120 comprises a center hole 120b and a cutout 120c, and this hub 120a is exposed at the center hole 119a.

The shutters 121 are metal plates having a predetermined shape so as to extend along the two surface sides of the disc 120, and the shutters 121 are concentrically rotatable with the disc 120. The shutters 121 are urged counterclockwise by spring means (not shown) and normally assumes a closed position shown in FIG. 3. In this closed position, the shutters 121 close the elongated holes 119b and the holes 119c in the cartridge chassis 119. A flexible belt 122 has its left end fixed to the shutters 121. In addition, an engaging projection 122a formed on the right end of the belt 122, is slidably fitted within the right groove 119g so that the engaging projection 122a is slidable in the directions of the arrows A and B. Shutters 123 are provided correspondingly with the pair of holes 119e so that the holes 119e can be opened or closed by manually sliding the shutters 123 to assume one of two positions. When the hole 119e is closed by the shutter 123, the light from the sensor fixed above the frame 12-1 which should reach the sensor 15, will be blocked by the shutter 123. In this case, the erasing head of the magnetic head 56 is made inoperative so as to prevent the erroneous erasure of recorded information signals on the disc 120.

Next, description will be given with respect to the operation of the apparatus 11. When loading the cartridge 118 into the apparatus 11, the cartridge 118 is inserted in the direction of the arrow B as shown in FIG. 3, through the window 54a in the front panel 54-1, and through the window 25a in the door holder 25. Accordingly, the door 45 is opened against the force exerted by the spring 51, and the cartridge 118 is placed on the cartridge holder 24-1. In this state, the guiding projections 24h of the cartridge holder 24-1 respectively fit into the grooves 119g of the cartridge 118, and the cartridge 118 is guided by the grooves 119g. This guiding of the cartridge 118 by the grooves 119g prevents hopping or floating of the cartridge upon insertion, and ensures correct insertion of the cartridge 118. As the cartridge 118 is inserted, the clamper 43 rides over the upper surface of the cartridge chassis 119 against the force exerted by the spring 42. In addition, the cartridge 118 makes contact with the rear plate part 31a of the push-out plate 31.

Thereafter, the cartridge 118 and the push-out plate 31 are unitarily pushed in the direction of the arrow B against the force exerted by the spring 52. In this state, the upper surface of the cartridge chassis 119 is pushed downwards by the pair of leaf springs 40 of the clamp lever 36, and more positively prevents the floating of the cartridge 118. As the rear plate part 31a of the push-out plate 31 approaches the rear wall 24d of the cartridge holder 24-1, the cam plate parts 31e of the push-out plate 31 respectively push against the upper parts 32a of the cam levers 32 in the side plates 19-1 and 19-2. Thus, both the cam levers 32 are rotated in the direction of an arrow G.

Then, the cam pins 32b of the cam levers 32 respectively push the front edges of the rectangular cam holes 21b which are formed in the cam plates 21 of the push-eject plate 20-1, towards the front of the apparatus 11, that is, in the direction of the arrow A. Accordingly, the push-eject plate 20-1 begins to slide in the direction of the arrow A (towards the front of the apparatus 11). As a result, the cam pins 37 and 38 on both sides of the cartridge holder 24-1, are relatively guided along the horizontal cam parts 21a-1 and 21c-1 of the cam hole 21a and the cam part 21c, and move towards the rear of the apparatus 11.

The cam pins 37 and 38 respectively become guided by the sloping cam parts 21a-2 and 21c-2 of the cam hole 21a and the cam part 21c, when the rear plate part 31a makes contact with the rear wall 24d of the cartridge holder 24-1 and the cartridge 118 and the push-out plate 31 stop sliding in the direction of the arrow B. The cam pins 37 and 38 are urged downwards by the coil springs 53, and the cam pins 37 and 38 hence push downwards with respect to the sloping cam parts 21a-2 and 21c-2. Thus, among the pushing forces acting on the sloping cam parts 21a-2 and 21c-2, components of forces in the direction of the arrow A (towards the front of the apparatus 11) act on the push-eject plate 20-1.

Accordingly, the push-eject plate 20-1 slides towards the front of the apparatus 11, and accompanied by this sliding movement of the push-eject plate 20-1, the cartridge holder 24-1 (the push-out plate 31, the cartridge 118) begins to slide in the direction of the arrow D (downwards) under the guidance provided by the cam pins 37 and the vertical cam holes 19c in the side plates 19-1 and 19-2. When the cam pins 37 and 38 relatively move downwards along the sloping cam parts 21a-2 and 21c-2 and hit the lower end of the sloping cam parts 21a-2 and 21c-2, the push-eject plate 20-1 stops sliding frontwards and the cartridge holder 24-1 stops sliding downwards. As a result, the push-button 22 of the push-eject plate 20-1 projects frontwards through the window 54b in the front panel 54-1, up to a position indicated by a two-dot chain line in FIG. 1.

At the same time, the small diameter parts 13a of the pair of positioning pins 13 fit into the pair of positioning holes 119d in the cartridge 118. Further, the upper projecting part of the shaft 100 fits into the center hole 120b in the disc 120, and the hub 120a is placed onto the upper surface of the disc table 101. Moreover, the disc 120 undergoes slight rotation within the cartridge 118, so that the pin 101a fits into the cutout 120c. As a result, the disc 120 is positioned concentrically with respect to the shaft 100 of the rotor 105 in the motor 93, and becomes unitarily rotatable with the shaft 100. The loading of the cartridge 118 is completed in this state.

While the above described loading operation is carried out, the front of the cartridge 118 projects slightly from the front panel 54-1, through the window 25a in the door holder 25 and through the window 54a in the front panel 54-1, even in the state where the cartridge 118 is inserted to the limit in the direction of the arrow B. The cartridge 118 moves downwards in this state where the front of the cartridge 118 is projecting slightly from the front panel 54-1. The height of the window 54a in the front panel 54-1 is set to a length which is greater than the sum of the thickness of the cartridge 118 and the distance over which the cartridge 118 moves downwards, and the window 54a will not interfere with the downward movement of the cartridge 118 upon loading. In addition, the window 25a in the door holder 25 unitarily moves downwards (or upwards) with the cartridge 118, because the door holder 25 is integrally provided on the cartridge holder 24-1. If the door holder 25 is fixed to the frame 12-1 and the window 25a remains stationary upon loading and unloading of the cartridge 118, gaps will be formed above and below the cartridge 118 within the window 25a as the cartridge 118 is moved downwards and upwards. This design is hence disadvantageous because dust particles and the like may easily enter within the apparatus 10 through these gaps which will be formed during the loading and unloading of the cartridge 118. However, in the present embodiment, such gaps will not be formed during the loading and unloading of the cartridge 118, and the performance and reliability of the apparatus 11 is improved.

Next, description will be given with respect to the operation of the cartridge 118 itself during the loading operation. First, as the rear of the cartridge 118 makes contact with the rear wall 31a of the push-out plate 31, the guiding projection 24h of the cartridge holder 24-1 makes contact with the engaging projection 122a of the belt 122 and causes the projection 122a to relatively slide with respect to the cartridge 188 in the direction of the arrow A. Hence, the shutters 121 are pulled by the belt 122, and begin to rotate clockwise against the force exerted by the spring means so as to expose the elongated holes 119b and the holes 119c. The disc 120 thus becomes exposed through the elongated holes 119b and the holes 119c. In addition, in the state where the cartridge 118 is inserted to the limit in the direction of the arrow B, the clamper 43 which is riding over the upper surface of the cartridge chassis 119 falls into the center hole 119a due to the force exerted by the coil spring 42. As a result, the clamper 43 pushes the hub 120a downwards, and the disc 120 is clamped between the clamper 43 and the disc table 101. Furthermore, the guide plate 39 of the clamp lever 36 unitarily moves downwards with the cartridge holder 24-1, as the cartridge holder 24-1 moves downwards. Accordingly, because the guide pin part 58b of the pad support arm 58 is restricted by the guide plate 39, the pad support arm 58 is rotated downwardly by the force exerted by the spring 61. The pad 59 gently makes contact with the disc 120 through one of the elongated windows 119b so that the magnetic head 56 makes positive contact with the disc 120 through the other elongated window 119b.

When the cartridge 118 is loaded, the sensors 14, 15, and 16 respectively oppose the cutout 119f, the left holes 119e, and the holes 119c in the cartridge 118. Thus, it is detected that side a of the disc 120 opposes the magnetic head 56, when the light from one sensor fixed above the frame 12-1 passes through the cutout 119f and reaches the sensor 14. If the light from another sensor fixed above the frame 12-1 is blocked by the shutter 123 at the left hole 119e, the erasing head of the magnetic head 56 is made inoperative in order to prevent erroneous erasure of recorded information signal on the disc 120.

Selection switches (not shown) are provided on a panel (not shown) arranged above the frame 12-1, for selecting side a or side b of the disc 120. If the selection switch for selecting side a of the disc 120 is pushed, agreement is reached between the sensor 14 which has detected side a of the disc 120, and the apparatus 11 is put into a state capable of carrying out recording or reproduction with respect to side a of the disc 120.

Next, when a reproducing switch (not shown) provided on the above panel (not shown) is pushed, the motor 93 is driven as described before, and the disc 120 is rotated clockwise, unitarily with the rotor 105. When the disc 120 assumes a predetermined rotational position within the cartridge 118 where a detection hole (not shown) in the disc 120 coincides with the holes 119c in the cartridge chassis 119, the light from still another sensor which is fixed above the frame 12-1 passes through the holes 119c in the cartridge chassis 119 and the detection hole in the disc 120 and reaches the sensor 16. When this light reaches the sensor 16, it is detected that starting positions on the tracks which are radially aligned and where the reproduction is to be started, coincide with a center line of the elongated holes 119b. For example, this means that the starting position on the outermost peripheral track on the disc 120 opposes the magnetic head 56. As the disc 120 is further rotated from this predetermined rotational position, the information signal recorded on the outermost peripheral track on the disc 120 is reproduced by the magnetic head 56. When the disc 120 undergoes one revolution and the detection hole in the disc 120 coincides with the holes 119c in the cartridge chassis 119, the motor 93 stops rotating and the disc 120 therefore stops rotating, and the reproduction of the information signal from one track is completed.

Next, the stepping motor 64 is rotated in a step for a predetermined angle, in the direction of the arrow E. Then, the step rotation of the stepping motor 64 is transmitted to the carriage 55 through the guide belt 73, and the carriage 55 slides in a step by a predetermined distance, in the direction of the arrow A. Accordingly, the magnetic head 56 moves from the outermost peripheral track on the disc 120 to an adjacent track which is formed on the inner periphery of the disc 120. The recorded information signal is reproduced from this adjacent track as the disc 120 undergoes another revolution. Similarly thereafter, the stepping motor 64 and the motor 93 are alternately driven, so that the recorded information signal is successively reproduced from a plurality of tracks on the disc 120.

When the reproduction of the recorded information signal from a predetermined track is completed and the motor 93 stops rotating, a stop switch (not shown) is pushed. Then, the stepping motor 64 rotates continuously in the direction of the arrow F, and the carriage 55 slides in the direction of the arrow B and returns to the starting position. As a result, the projecting plate part 55f becomes positioned between the sensors 80 and 81 to block the light between these sensors 80 and 81, and the stepping motor 64 stops rotating.

Next, description will be given with respect to the operation to eject the cartridge 118. When the push-button 22 is pushed in the direction of the arrow B, the cam plates 21 of the push-eject plate 20-1 unitarily slide in the same direction. Hence, the cam pins 37 and 38 of the cartridge holder 24-1 are forcibly guided by the sloping cam parts 21a-2 and 21c-2 of the cam hole 21a and the cam part 21c. The cartridge holder 24-1 thus moves upwards together with the cartridge 118, against the forces exerted by the coil springs 53. The upward movement of the cartridge holder 24-1 stops when the cam pins 37 and 38 move within the horizontal cam parts 21a-1 and 21c-1. Accompanied by this upward movement of the cartridge holder 24-1, the center hole 120b and the cutout 120c in the disc 120 respectively separate from the shaft 100 and the pin 101a. Moreover, the positioning holes 119d in the cartridge 118 separate from the positioning pins 13, and the positioning with respect to the cartridge 118 is released. At the same time, the pad support arm 58 is returned by being rotated upwards, because the guide pin part 58b is displaced upwards by the guide plate 39 of the clamp lever 36. Therefore, the pad 59 separated from the elongated hole 119b.

When the cartridge holder 24-1 moves upwards, the push-out plate 31 moves upwards unitarily with the cartridge holder 24-1. Accordingly, when the cartridge 118 is released from the loaded state, the push-out plate 31 begins to push and slide the cartridge 118 in the direction of the arrow A, against the forces exerted by the coil springs 52. The cartridge 118 is thus slid forcibly in the direction of the arrow A, due to a combined force which includes the pushing force of the push-out plate 31 and a force exerted by the spring means which urges the shutters 121 to close. The force exerted by the spring means which urges the shutters 121 to close, causes the engaging projection 122a of the belt 122 to move in the direction of the arrow B and therefore push against the guide projection 24h of the cartridge holder 24-1. A sliding inertial force of the cartridge 118 itself acts on the cartridge 118 as it slides, and substantially half the front end of the cartridge 118 finally projects from the front panel 54-1, through the window 54a.

In this state, the push-eject plate 20-1 is slid to the limit in the direction of the arrow B. Accordingly, the cam pins 32b of the cam levers 32 are respectively pushed by the front edges of the rectangular cam holes 21b in the cam plates 21. As a result, the cam levers 32 respectively rotate in the direction of the arrow H in FIG. 3 and return. When the cam levers 32 return, the cam pins 32b make contact with the rear edges of the stopper holes 19d in the side plates 19-1 and 19-2. In addition, the push-out plate 31 returns by sliding in the direction of the arrow A, and the push-out plate 31 stops sliding when the guide projections 31b make contact with the step parts 24b-1. Further, the leaf springs 40 of the clamp lever 36 also return, and the clamper 43 again rides over the upper surface of the cartridge chassis 119.

Finally, the operator holds the front end of the cartridge 118 which is projecting from the front panel 54-1, and pulls the cartridge 118 in the direction of the arrow A. The cartridge 118 is completely extracted from the apparatus 11 as the cartridge 118 extracted through the door holder 25, the window 25a, and the window 54a in the front panel 54-1. When the cartridge 118 is completely extracted from the apparatus 11, the clamper 43 is returned by being displaced downwards, and the door 45 automatically closes to close the window 25a.

If the reproduction is to be carried out with respect to side b of the disc 120, the cartridge 118 is inserted into the apparatus 11 with side b of the disc 120 facing down. In this case, the cartridge 118 is inserted into the apparatus 11 through the window 54a in the front panel 54-1 and the door holder 25, as in the case where the reproduction is to be carried out with respect to the side a of the disc 120. Thus, the inserted cartridge 118 is placed on the cartridge holder 24-1, and is lowered to assume the loaded position. In this case, the engaging projection 122a of the belt 122 engages with the left guide projection 24h of the cartridge holder 24-1, and not the right guide projection 24h. Moreover, the sensor 14 will not oppose the cutout 119f in the cartridge chassis 119, and the light from the sensor fixed above the frame 12-1 will not reach the sensor 14. As a result, it is detected that the side b of the disc 120 is ready for the reproduction.

Figure 11:
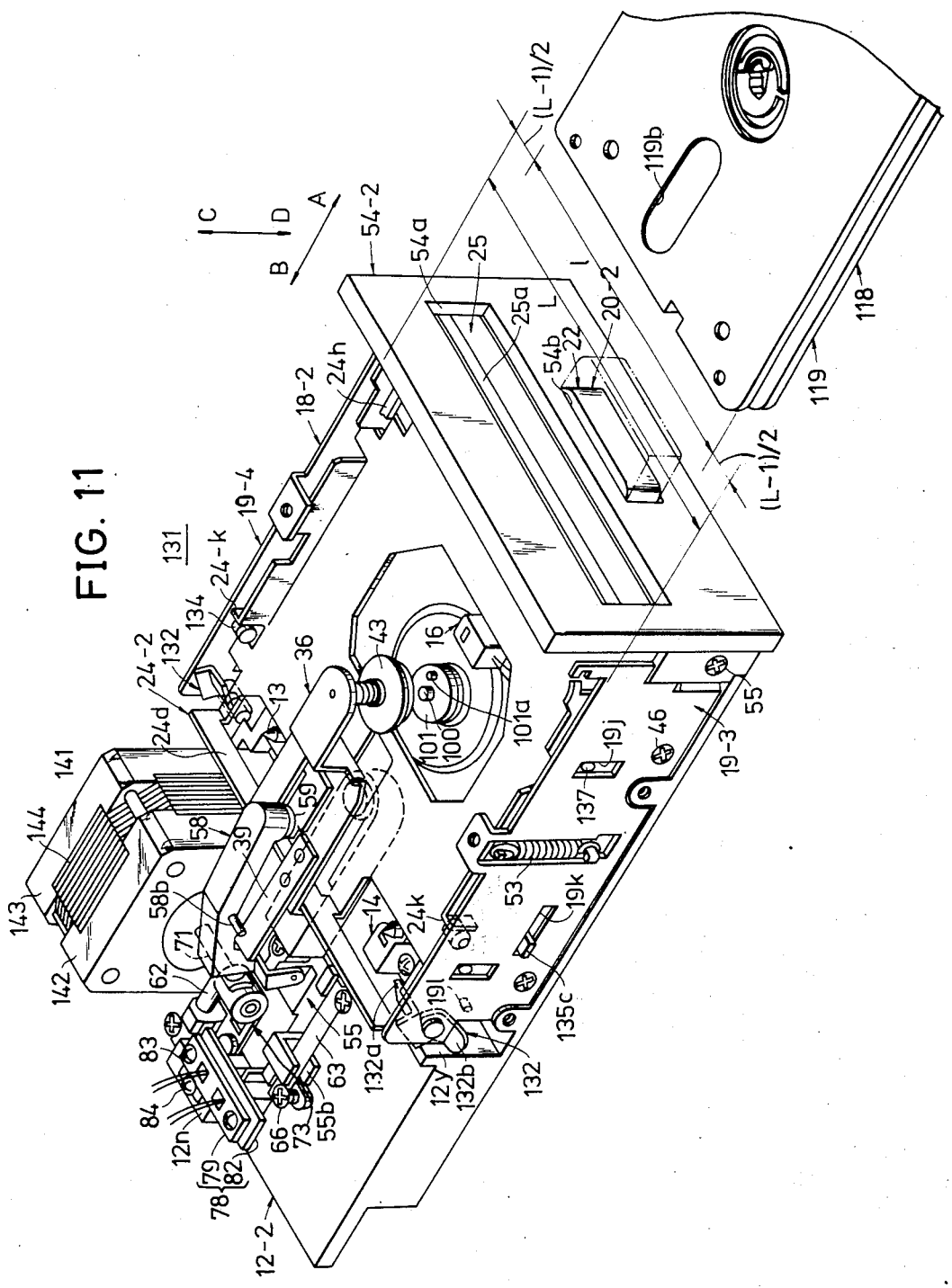
FIG. 11 is a perspective view showing a second embodiment of a floppy disc recording and/or reproducing apparatus according to the present invention is its entirety.
Figure 12:
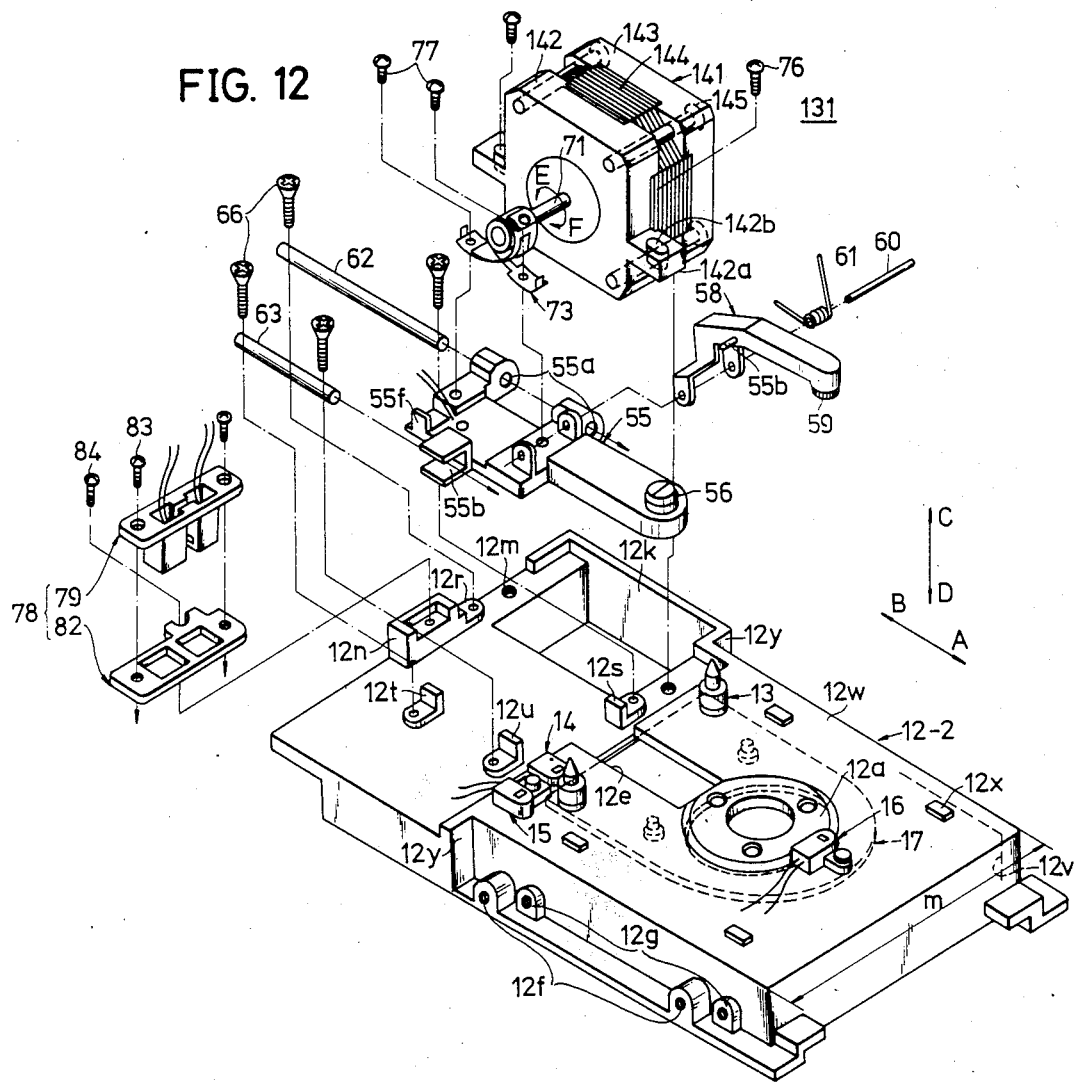
FIGS. 12 and 13 are disassembled perspective views respectively showing a peripheral part of a frame and a loading mechanism in the apparatus shown in FIG. 11.
Figure 13:
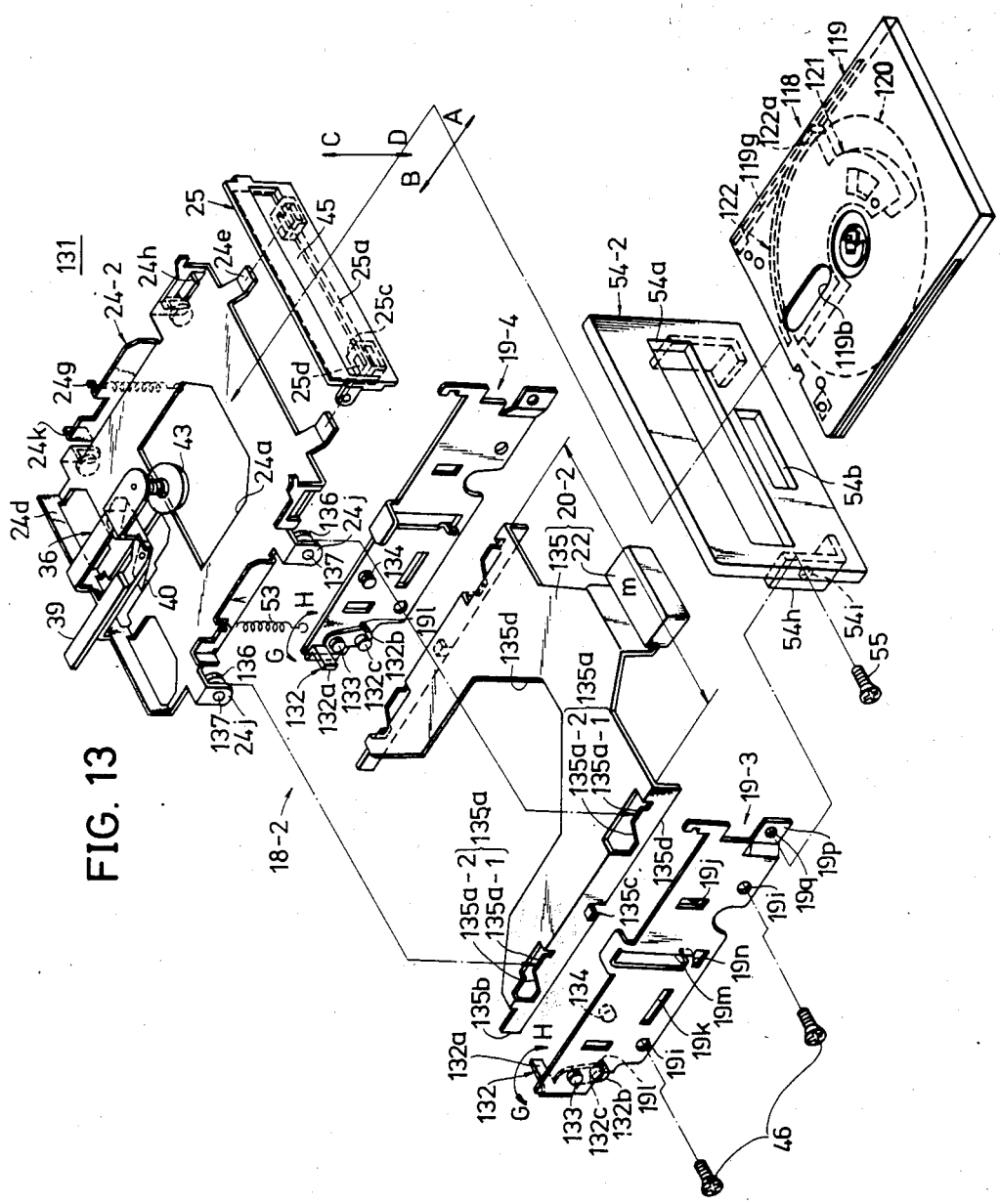

Next, description will be given with respect to the general construction of a second embodiment of a floppy disc recording and/or reproducing apparatus according to the present invention, by referring to FIGS. 11 through 13. In FIGS. 11 through 13, those parts which are the same as those corresponding parts are designated by the same reference numerals, and their description will be omitted.

In FIGS. 11 through 13, a floppy disc recording and/or reproducing apparatus 131 comprises a frame 12-2. The differences between the frame 12-1 in the first embodiment described previously, and the frame 12-2 in the present embodiment, are as follows. As shown in FIG. 12, the frame 12-2 comprises a projecting table 12w which has a width m at the front upper surface thereof, four projections 12x formed on the upper surface of the table 12w, and stopper parts 12y formed on both sides of the table 12w. The motor accommodating opening 12k does not have positioning ribs 12l.

As shown in FIG. 13, a loading mechanism 18-2 comprises side plates 19-3 and 19-4, a push-eject plate 20-2, and a cartridge holder 24-2. The side plate 19-3 comprises a pair of mounting holes 19i, a pair of vertical holes 19j, an elongated guide hole 19k, an inwardly projecting stopper 19i, a spring accommodating hole 19m, and a mounting plate part 19p. The spring accommodating hole 19m has a projection 19n for hooking an end of a spring, and the mounting plate part 19p has a screw hole 19q. A cam lever 132 is pivotally supported on the side plate 19-3 by a pin 133, at the rear on the inner side of the side plate 19-3. The cam lever 132 comprises an inwardly bent part 132a, a lower part 132b, and a cam pin part 132c which functions as a second cam part. A guide roller 134 is also pivotally supported on the side plate 19-3, at the rear on the inner side of the side plate 19-3. The side plate 19-4 has a shape and configuration symmetrical to the side plate 19-3. The side plates 19-3 and 19-4 are mounted on both sides of the frame 12-2, nearer to the front of the frame 12-2. The screws 46 are screwed in through the mounting holes 19i and the screw holes 12g, and secure the side plates 19-3 and 19-4 to the frame 12-2. The push-button 22 is provided at the front end of a cam plate 135 of the push-eject plate 20-2. The cam plate 135 has a substantially U-shaped cross section, and the distance between the two side walls of the cam plate 135 is set to m. The cam plate 135 comprises a pair of cam holes 135a formed on both sides of the cam plate 135, a rear cam part 135b formed at the rear of each of the side walls of the cam plate 135, a guide projection 135c formed on each of the side walls of the cam plate 135, and a cutout 135d. Each cam hole 135a comprises a horizontal cam part 135a-1 and a sloping cam part 135a-2, and functions as a third cam part. The rear cam parts 135b function as a fourth cam part. The push-eject plate 20-2 is fitted over the table 12w of the frame 12-2, between the side plates 19-3 and 19-4, so as to be guided on the table 12w. In this state, the bottom surface of the cam plate 135 makes contact with all of the four projections 12x. Moreover, the guide projections 135c fit into the elongated guide holes 19k, and the cam parts 135b are respectively located at positions corresponding the positions of the cam pins 132c of the cam lever 132.

The projecting hook parts 24g and the guide plate parts 24i which are provided on the cartridge holder 24-1 shown in FIG. 3, are eliminated in the cartridge holder 24-2 shown in FIG. 13. Instead, a guide plate part 24k is provided on both sides of the cartridge holder 24-2, for providing guidance in the directions of the arrows C and D. In addition, a cam roller 136 is supported by a pin 137 on each of the pair of downwardly bent parts 24j which are provided on both sides of the cartridge holder 24-2. The cam rollers 136 function as a first cam part.

The cartridge holder 24-2 which is already mounted with the door holder 25, is arranged on the upper surface of the push-eject plate 20-2. In this state, the cam rollers 136 are arranged at locations which correspond to the horizontal cam parts 135a-1 of the cam holes 135a in the cam plate 135. Moreover, the guide plate parts 24k respectively make contact with the guide rollers 134 which are provided on the side plates 19-3 and 19-4. Further, the cartridge holder 24-2 is urged downwards by the forces exerted by the pair of coil springs 53 which are respectively stretched between the projecting hook parts 24g and the projections 19n formed on the side plates 19-3 and 19-4.

A front panel 54-2 is made of plastics. The front panel 54-2 comprises a pair of L-shaped mounting plate parts 54h, in addition to the windows 54a and 54b. Each of the mounting plate parts 54h comprises a hole 54i. The front panel 54-2 is mounted on the side plates 19-3 and 19-4 in a state where the mounting plate parts 54h are respectively fitted over the mounting plate parts 19p of the side plates 19-3 and 19-4. The screws 55 are screwed through the holes 54i and the screw holes 19q, to secure the front panel 54-2 to the frame 12-2.

In the loading mechanism 18-2, the push-eject plate 20-2 is smoothly slidable only in the directions of the arrows A and B with high precision, because the cam plate 135 is fitted over the table 12w of the frame 12-2 to be guided on the table 12w and the guide projections 135c of the cam plate 135 are restrictively guided within the elongated guide holes 19k in the side plates 19-3 and 19-4. Accordingly, the precision with which the push-eject plate 20-2 moves, and the operational characteristic of the push-eject plate 20-2, are improved. In addition, the cartridge holder 24-2 is only slidable in the directions of the arrows C and D, because the guide plate parts 24k are restrictively guided by the guide rollers 134 of the side plates 19-3 and 19-4 and the pins 137 are restrictively guided within the vertical holes 19j in the side plates 19-3 and 19-4.

Normally, the push-eject plate 20-2 is pushed to the limit in the direction of the arrow B, and is in the so-called eject position as shown in FIG. 11. Accordingly, the cam rollers 136 are restrictively guided by the horizontal cam parts 135a-1 of the cam holes 135a in the cam plate 135, and the cartridge holder 24-2 is slid to the limit in the direction of the arrow C against the forces exerted by the coil springs 53 to assume the eject position. In addition, the cam pins 132c of the cam parts 132b are respectively pushed rearwards by the cam parts 135b. Thus, the cam levers 132 are respectively rotated to the limit in the direction of the arrow H, and assume the rotational positions shown in FIG. 11. In this state, the cam parts 135b make contact with the stopper parts 12y of the frame 12-2.

Suppose that the width of the loading mechanism 18-2 is represented by L, and the width of the floppy disc cartridge 118 is represented by l, where L is larger than l. According to the loading mechanism 18-2 shown in FIG. 11, the linked mechanism parts such as the side plates 19-3 and 19-4, the cam levers 132, the cam plate 135, and the cam rollers 136 of the cartridge holder 24-2, are all provided within a relatively narrow space of $(L-l)$. That is, with respect to one side of the loading mechanism 18-2, the linked mechanism parts are all provided within a space of $(L-l)/2$. Thus, the linked mechanism parts of the loading mechanism 18-2 are all downsized, and as a result, the overall size of the apparatus 131 is reduced.

A stepping motor 141 comprises metal brackets 142 and 143, a yoke 144 which is wound with a coil (not shown) and disposed between the brackets 142 and 143, and the motor shaft 71 which is rotatably supported by the brackets 142 and 143. The two brackets 142 and 143 are secured to each other by four screws 145. A mounting plate part 142a having a mounting hole 142b, is integrally formed on both sides of the bracket 142. As in the case of the first embodiment described previously, the guide belt 73 is fixed to the motor shaft 71.

The stepping motor 141 is fitted into the motor accommodating opening 12k in the frame 12-2, and the mounting plate parts 142a are respectively positioned on the upper surface of the frame 12-2. The stepping motor 141 is secured to the frame 12-2 by the screws 76 which are screwed in through the mounting holes 142b and the screw holes 12m. The guide belt 73 is thereafter fixed to the carriage 55 as in the case of the first embodiment.

Because the mounting plate part 142a is integrally formed on the bracket 142, there is no need to use an independent member for securing the stepping motor 141 on the frame 12-2. As a result, the construction is simplified, and the precision with which the motor 141 is mounted on the frame 12-2 is improved. In addition, the axis of the motor shaft 71 becomes perfectly perpendicular to the sliding direction of the carriage 55 when the motor 141 is mounted on the frame 12-2, and improves the operating accuracy of the carriage 55. The starting position of the carriage 55 may be set with ease by integrally adjusting the position of the motor 141 and the carriage 55 in the direction of the arrow A or B, within a range which is permitted by the provision of the mounting holes 142b.

Next, description will be given with respect to the operation of the apparatus 131. When loading the cartridge 118 into the apparatus 131, the cartridge 118 is inserted through the window 54a in the front panel 54-2 and through the window 25a in the door holder 25, in the direction of the arrow B in FIG. 13. The inserted cartridge 118 finally rests on the upper surface of the cartridge holder 24-2. In this state, the guiding projections 24h of the cartridge holder 24-2 respectively fit into the grooves 119g of the cartridge 118, and the cartridge 118 is guided by the grooves 119g. This guiding of the cartridge 118 by the grooves 119g prevents hopping or floating of the cartridge upon insertion, and ensures correct insertion of the cartridge 118. As the cartridge 118 is inserted, the clamper 43 rides over the upper surface of the cartridge chassis 119. In addition, the cartridge 118 is pushed downwards by the pair of leaf springs 40 of the clamp lever 36. Thereafter, the cartridge 118 is pushed further in the direction of the arrow B against the force exerted by the spring means which normally keeps the shutters 121 closed. Thus, the rear of the chassis 119 makes contact with and pushes against the parts 132a of the cam levers 132 provided on the side plates 19-3 and 19-4. Accordingly, the cam levers 132 are respectively rotated in the direction of the arrow G, and the cam parts 132b make contact with the inwardly projecting stoppers 19l.

Then, the cam pin parts 132c of the cam levers 132 respectively push the cam parts 135b of the cam plate 135 in the direction of the arrow A. As a result, the push-eject plate 20-2 begins to slide in the direction of the arrow A. Hence, the cam rollers 136 on both sides of the cartridge holder 24-2 are relatively guided and moved along the horizontal cam parts 135a-1 of the cam holes 135a, in the direction of the arrow B.

By the time the rear end of the cartridge chassis 119 makes contact with the rear wall 24d of the cartridge holder 24-2 and the cartridge 118 stops sliding in the direction of the arrow B, the cam rollers 136 will have moved to the sloping cam parts 135a-2 of the cam holes 135a. The cam rollers 136 are urged downwards by the coil springs 53, and push downwards against the sloping cam parts 135a-2 of the cam holes 135a. Accordingly, among the pushing forces acting on the sloping cam parts 135a-2, components of forces towards the front of the apparatus 131, that is, in the direction of the arrow A, act on the push-eject plate 20-2.

Therefore, the push-eject plate 20-2 is slid further towards the front of the apparatus 131, and the cartridge holder 24-2 and thus the cartridge 118 begin to slide downwards (in the direction of the arrow D) under the guidance provided by the guide plate parts 24k, and the cam rollers 134 of the side plates 19-3 and 19-4. When the cam rollers 136 relatively slide downwards along the sloping cam parts 135a-2 and make contact with the lower ends of the sloping cam parts 135a-2, the push-eject plate 20-2 stops sliding towards the front of the apparatus 131 and the cartridge holder 24-2 stops sliding downwards. As a result, the push-button 22 on the push-eject plate 20-2 projects from the front panel 54-2 through the window 54b.

At the same time, the cartridge 118 is positioned at a predetermined position on the frame 12-2. In this state, the disc 120 is concentrically positioned with respect to the shaft 100, and is unitarily rotatable with the shaft 100. The loading of the cartridge 118 is completed in this state.

Next, description will be given with respect to the operation of the cartridge 118 itself during the loading operation. First, as the rear of the cartridge 118 reaches a position substantially in alignment with the guide plate parts 24k of the cartridge holder 24-2, the guiding projection 24h of the cartridge holder 24-1 makes contact with the engaging projection 122a of the belt 122 and causes the projection 122a to relatively slide with respect to the cartridge 188 in the direction of the arrow A. Hence, the shutters 121 are pulled by the belt 122, and begin to rotate clockwise against the force exerted by the spring means so as to expose the elongated holes 119b and the holes 119c. The disc 120 thus becomes exposed through the elongated holes 119b and the holes 119c. In addition, the clamper 43 clamps the disc 120, and the pad support arm 58 moves downwards so that the pad 59 gently makes contact with the disc 120 and the magnetic head 56 makes positive contact with the disc 120 through the elongated window 119b.

The disc 120 is driven and the recorded information signal is reproduced from the disc 120, in the same manner as in the apparatus 11 described previously.

Description will now be given with respect to the operation to eject the cartridge 118. When the push-button 22 is pushed in the direction of the arrow B, the cam plate 135 of the push-eject plate 20-2 unitarily slide in the same direction. Hence, the cam rollers 136 of the cartridge holder 24-2 are forcibly guided by the sloping cam parts 135a-2 of the cam holes 135a. The cartridge holder 24-2 thus moves upwards together with the cartridge 118, against the forces exerted by the coil springs 53. The upward movement of the cartridge holder 24-2 stops when the cam rollers 136 move within the horizontal cam parts 135a-1. Accompanied by this upward movement of the cartridge holder 24-2, the disc 120 separates from the shaft 100. At the same time, the pad support arm 58 is returned by being rotated upwards, and separates from the elongated hole 119b.

The cartridge 118 is thus slid forcibly in the direction of the arrow A, due to a force exerted by the spring means which urges the shutters 121 to close. The force exerted by the spring means which urges the shutters 121 to close, causes the engaging projection 122a of the belt 122 to move in the direction of the arrow B and therefore push against the guide projection 24h of the cartridge holder 24-2. As a result, substantially half the front end of the cartridge 118 finally projects from the front panel 54-2, through the window 54a.

In this state, the push-eject plate 20-2 is slid to the limit in the direction of the arrow B. Accordingly, the cam pin parts 135c of the cam parts 132b are respectively pushed by the cam parts 135b of the the cam plate 135. As a result, the cam levers 132 which are supported on the side plates 19-3 and 19-4 respectively rotate in the direction of the arrow H in FIG. 13 and return. When the cam levers 132 return, the cam parts 132b make contact with the stopper parts 12y of the frame 12-2.

Further, the present invention is not limited to these embodiments, but various variations and modifications may be made without departing from the scope of the present invention.

What is claimed is:

1. A floppy disc recording and/or reproducing apparatus having a loading mechanism for loading a cartridge which accommodates a floppy disc, said apparatus comprising:
   a frame;
   a cartridge holder for holding said cartridge which is inserted into said cartridge holder, said cartridge holder being provided with at least two parts of first cam parts;
   urging means for urging said cartridge holder in a downward direction of said apparatus;
   a driving shaft rotatably supported on said frame, for driving said floppy disc to rotate;
   a first motor for driving said driving shaft to rotate;

a carriage having magnetic head, said carriage being supported on said frame and being movable in a predetermined direction, said magnetic head making contact with and being moved in a radial direction of said floppy disc which is rotating to carry out recording or reproduction while said carriage moves;

a second motor for driving said carriage to move;

a pair of side plates respectively extending along opposite sides of said frame; and push-eject means unitarily comprising an ejecting push-button and a pair of cam plates which are located inside said pair of side plates, said cam plates being provided with second cam parts each cooperating with one of said first cam parts of said cartridge holder, said cartridge being loaded with respect to said driving shaft when said cartridge is inserted into said cartridge holder so that said cartridge holder is moved in the downward direction of said apparatus due to an urging force of said urging means and the engagement between one of said first cam parts and a corresponding one of said second cam parts, said cartridge holder continuously assuming a horizontal position during a downward movement of said cartridge holder.

2. An apparatus as claimed in claim 1 in which said frame comprises a projecting table part, said pair of side plates are respectively provided on both sides of said projecting table part, said push-eject means is a member having a substantially U-shaped cross section, and said member is fitted over said projecting table part and is movable in the frontward and rearward directions of said apparatus under guidance of said projecting table part.

3. An apparatus as claimed in claim 1 in which a door holder having a window is fixed to the front of said cartridge holder means, said cartridge holder means is unitarily movable with said door holder in the upward and downward directions of said apparatus, and said cartridge is inserted through said window in said door holder to be placed onto said cartridge holder means.

4. An apparatus as claimed in claim 1 in which said carriage is movable in said predetermined direction under guidance of a pair of parallel guide members, a driving force from an output shaft of said second motor is transmitted to said carriage at an intermediate position between said pair of parallel guide members, and said driving force from the output shaft of said second motor acts in a direction which coincides with said predetermined direction.

5. An apparatus as claimed in claim 1 in which said second motor comprises a pair of brackets, a yoke wound with a coil and disposed between said pair of brackets, an output shaft rotatably supported by said pair of brackets, and a pair of mounting plate parts which are integrally formed on both sides of at least one of said pair of brackets, and said second motor is mounted on said frame by fixing said mounting plate parts onto said frame.

6. A floppy disc recording and/or reproducing apparatus having a loading mechanism for loading a cartridge which accommodates a floppy disc, said apparatus comprising:

a frame;

a driving shaft rotatably supported on said frame;

a cartridge holder for holding said cartridge which is inserted into said cartridge holder, said cartridge holder being provided with at least two pairs of first cam parts;

urging means for urging said cartridge holder in a downward direction of said apparatus;

a pair of side plates respectively extending along opposite sides of said frame;

push-eject means unitarily comprising an ejecting push-button and a pair of cam plates which are located inside said pair of side plates, said cam plates being provided with second cam parts each cooperating with one of said first cam parts of said cartridge holder, said cartridge being loaded with respect to said driving shaft when said cartridge is inserted into said cartridge holder so that said cartridge holder is moved in the downward direction of said apparatus due to an urging force of said urging means and the engagement between one of said first cam parts and a corresponding one of said second cam parts, said cartridge holder continuously assuming a horizontal position during a downward movement of said cartridge holder;

a motor for dirving said driving shaft to rotate; and magnetic head means for carrying out recording or reproduction by making contact with said floppy disc which is rotating, said motor comprising a stator having a plurality of coils, and a rotor fixed to said driving shaft and having permanent magnets which are separated from and oppose said plurality of coils, said plurality of coils being arranged on the same plane as a printed circuit plate which is mounted on said frame and respectively having a relatively small thickness.

7. An apparatus as claimed in claim 1, in which one of said first cam parts comprises a cam pin, and a corresponding one of said second cam parts comprises a boomerang-shaped cam hole provided in said cam plate.

8. An apparatus as claimed in claim 1, in which one of said first cam parts comprises a cam pin, and a corresponding one of said second cam parts comprises a bent cam part of said cam plate.

9. An apparatus as claimed in claim 1, in which one of said first cam parts comprises a cam roller, and a corresponding one of said second cam parts comprises a bent cam hole of said cam plate.

10. An apparatus as claimed in claim 1, in which said apparatus further comprises a cam lever which is pivotally supported on one of said pair of side plates, said cartridge being inserted into said cartridge holder so that said cam lever is directly or indirectly rotated by said cartridge, whereby said push-eject means is moved in the frontward direction of said apparatus due to the engagement between said cam lever and one of said pair of cam plates.

* * * * *